US009075426B2

(12) United States Patent
Loeppert et al.

(10) Patent No.: US 9,075,426 B2
(45) Date of Patent: Jul. 7, 2015

(54) LOW PROFILE HUMAN INTERFACE DEVICE

(75) Inventors: Peter V. Loeppert, Hoffman Estates, IL (US); Sage Hahn, Chicago, IL (US); Michael Durso, Niles, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 578 days.

(21) Appl. No.: 12/899,082

(22) Filed: Oct. 6, 2010

(65) Prior Publication Data

US 2011/0079864 A1 Apr. 7, 2011

Related U.S. Application Data

(60) Provisional application No. 61/249,029, filed on Oct. 6, 2009.

(51) Int. Cl.

| | |
|---|---|
| ***G01L 1/26*** | (2006.01) |
| ***G01L 1/00*** | (2006.01) |
| ***G05G 9/047*** | (2006.01) |

(52) U.S. Cl.

CPC ...... *G05G 9/047* (2013.01); *G05G 2009/04744* (2013.01); *G05G 2009/04762* (2013.01)

(58) Field of Classification Search

USPC .................................................... 73/862.391

See application file for complete search history.

(56) References Cited

U.S. PATENT DOCUMENTS

| | | | | |
|---|---|---|---|---|
| 7,476,952 | B2 | 1/2009 | Vaganov | |
| 7,554,167 | B2 * | 6/2009 | Vaganov | 257/415 |
| 2008/0030482 | A1 | 2/2008 | Elwell et al. | |
| 2008/0165159 | A1 | 7/2008 | Soss et al. | |
| 2009/0212377 | A1 * | 8/2009 | Vaganov et al. | 257/415 |

FOREIGN PATENT DOCUMENTS

| | | |
|---|---|---|
| JP | 2005-63408 | 3/2005 |

OTHER PUBLICATIONS

International Search Report and Written Opinion for PCT/US2010/051642, dated Aug. 2, 2011.

* cited by examiner

*Primary Examiner* — Lisa Caputo
*Assistant Examiner* — Brandi N Hopkins
(74) *Attorney, Agent, or Firm* — Fitch, Even, Tabin & Flannery LLP

(57) ABSTRACT

A human interface device is provided, having a substrate. A strain sensitive die is coupled to the substrate wherein the die is capable of providing an electrical signal indicative of a force applied to the strain sensitive die. A force transfer element is positioned adjacent to the strain sensitive die and coupled to the strain sensitive die. A translation element is mechanically coupled to the force transfer element. An elastic element is at least partially surrounding the translation element and the force transfer element, wherein the elastic element provides the mechanical coupling between the translation element and the force transfer element. A force applied to the translation element causes stretching of the elastic element, wherein the stretching of the elastic element causes a force to be applied to the force transfer element; and wherein the force applied to the force transfer element by the elastic element is then applied to the strain sensitive die.

8 Claims, 9 Drawing Sheets

LOW PROFILE HUMAN INTERFACE DEVICE

CROSS REFERENCE TO RELATED APPLICATION

This patent claims benefit under 35 U.S.C. §119(e) to U.S. Provisional Application No. 61/249,029 entitled "A Low Profile Human Interface Device" filed Oct. 6, 2009 the content of which is incorporated herein by reference in its entirety.

TECHNICAL FIELD

The present invention relates to pointing devices, and more particularly to a low profile interface device for an electronic device or a user interface control device using a microelectromechanical system (MEMS) silicon die.

BACKGROUND

The information content displayed on a graphical user interface (GUI) either incorporated into portable electronic devices or user interface control devices, such as remote controls continues to grow. These devices generally incorporate a joystick or a mouse button for navigating the information content. The joystick or the mouse button uses a mouse-pointing sensor. The sensor detects moving direction and intensity in relation to force supplied by the user onto the joystick or the mouse button. Signals generated by the mouse-pointing sensor are conditioned and processed by on-board logic to activate a pointer displayed by the GUI. However, navigating the information content, such as address lists, photos, and music content by having to click up and down buttons to search the lists is sometimes inefficient and annoying.

U.S. Pat. No. 7,554,167 to Vaganov describes one type of sensor, applicable to portable electronic devices, that utilizes a silicon strain gauge die with a boss. Typically, the silicon strain gauge die is sensitive to lateral forces applied to a tip of the boss. The boss transmits the force to a thinned region of the die where strain sensitive elements produce an electrical signal corresponding to the applied lateral force. The various embodiments incorporate an extension such as a post, a wire, or a spring that is fixedly bonded to the tip of the boss to create a user interface and extend the height of the device. U.S. Pat. No. 7,476,952 to Vaganov et al. further describes embodiments based on a strain sensitive die and utilizing various shaped interfaces to permit the user to apply a force signal to the die. Both U.S. Pat. No. 7,554,167 and U.S. Pat. No. 7,476,952 are incorporated into this disclosure by reference. What the prior art, including the two referenced patents, fail to address is that silicon strain gauge die are easily broken when overloaded. It is an objective of this invention to create a human interface device which is protected from overloads, thus making it reliable. It is a further objective of this invention to make the human interface device low profile, so that it fits into a wide variety of electronic devices. It is yet a further objective of this invention to minimize the number and the complexity of the components of the human interface device, thus rendering it to be potentially low cost to manufacture. Other benefits of this invention will be apparent to those skilled in the art.

BRIEF DESCRIPTION OF THE DRAWINGS

For a more complete understanding of the disclosure, reference should be made to the following detailed description and accompanying drawings wherein.

DETAILED DESCRIPTION OF THE INVENTION

Figure 1:
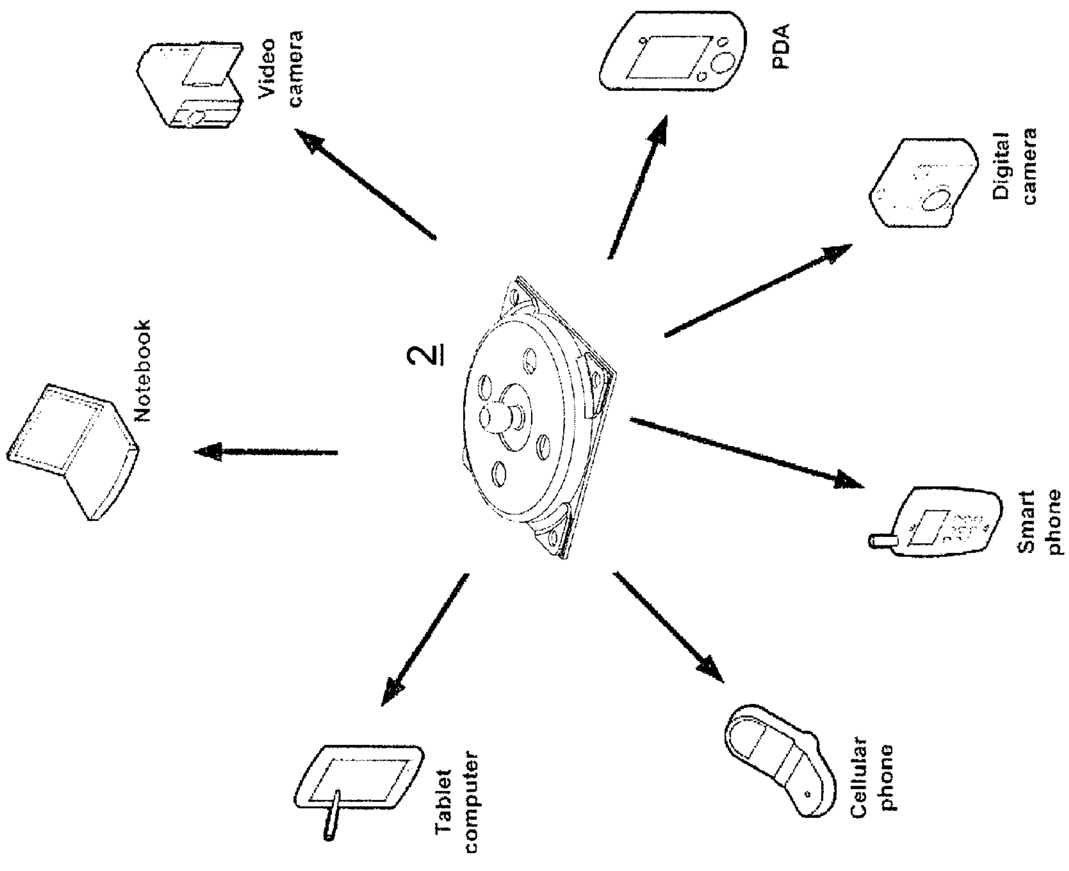
FIG. 1 is a perspective view of a human interface device according to various embodiments of the invention that may be utilized in various types of devices.
Figure 2:
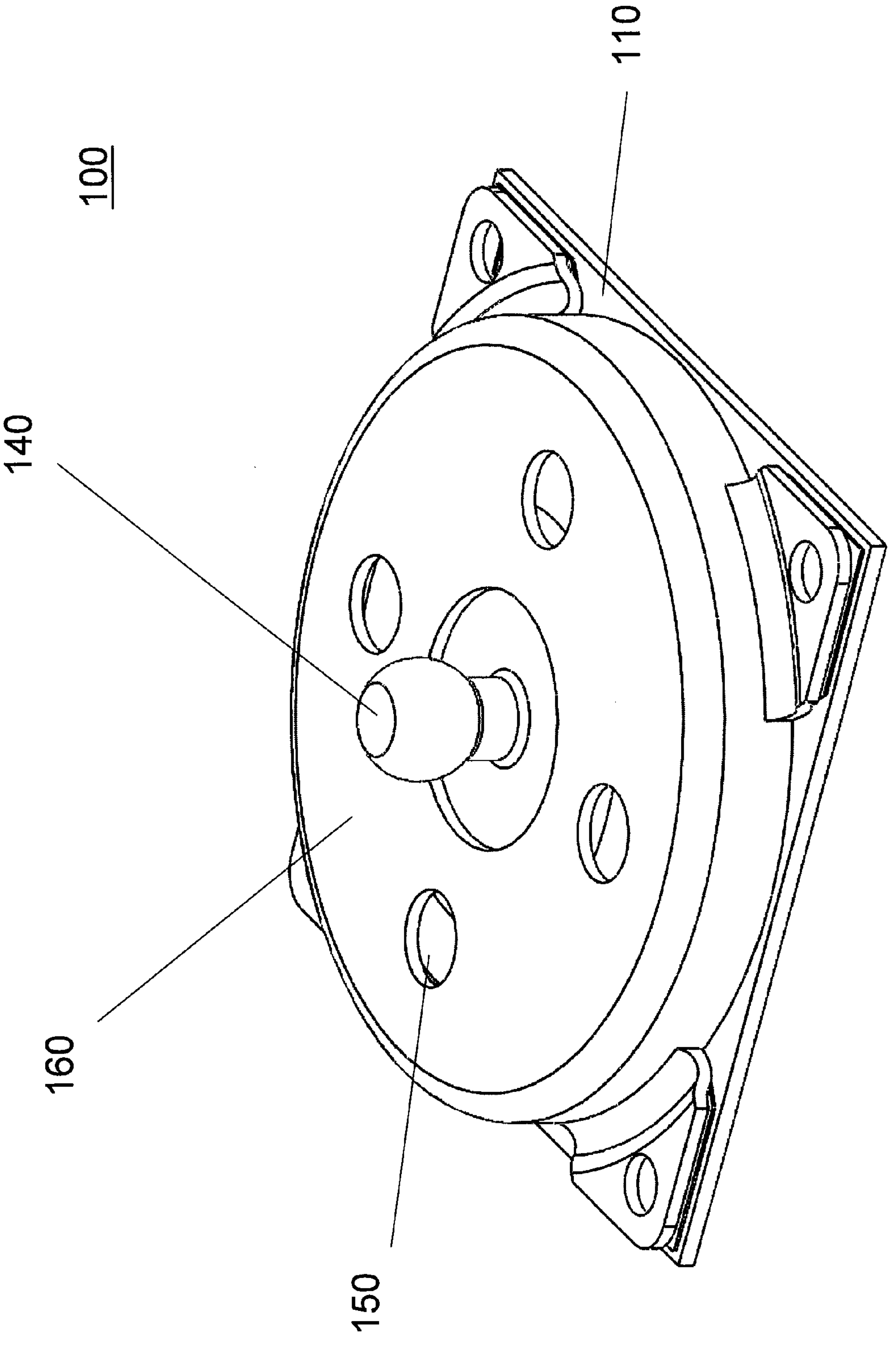
FIG. 2 is a perspective view of a human interface device according to an embodiment of the invention.
Figure 3:
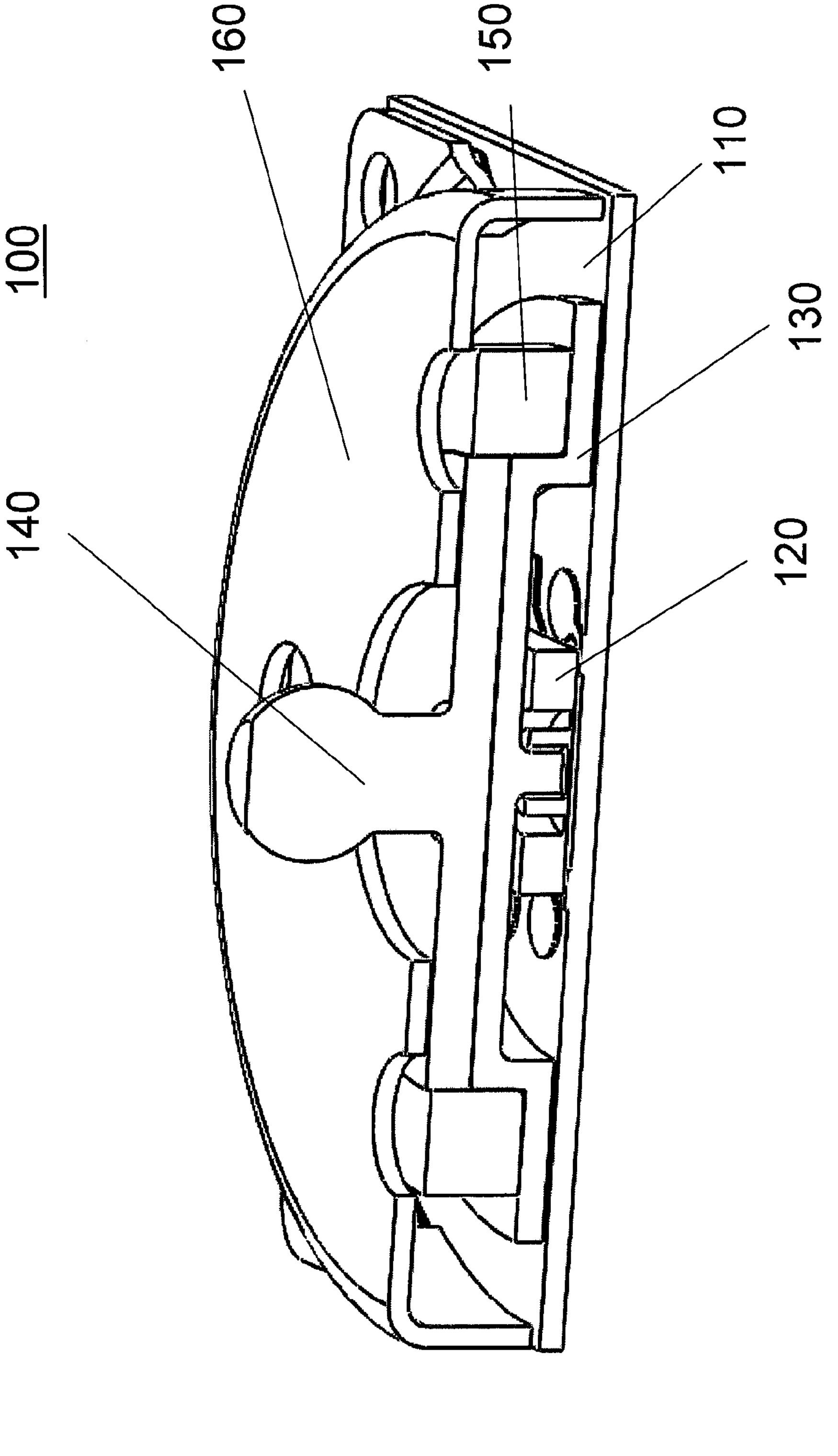
FIG. 3 is a cross-sectional view of the human interface device of FIG. 2.
Figure 4:
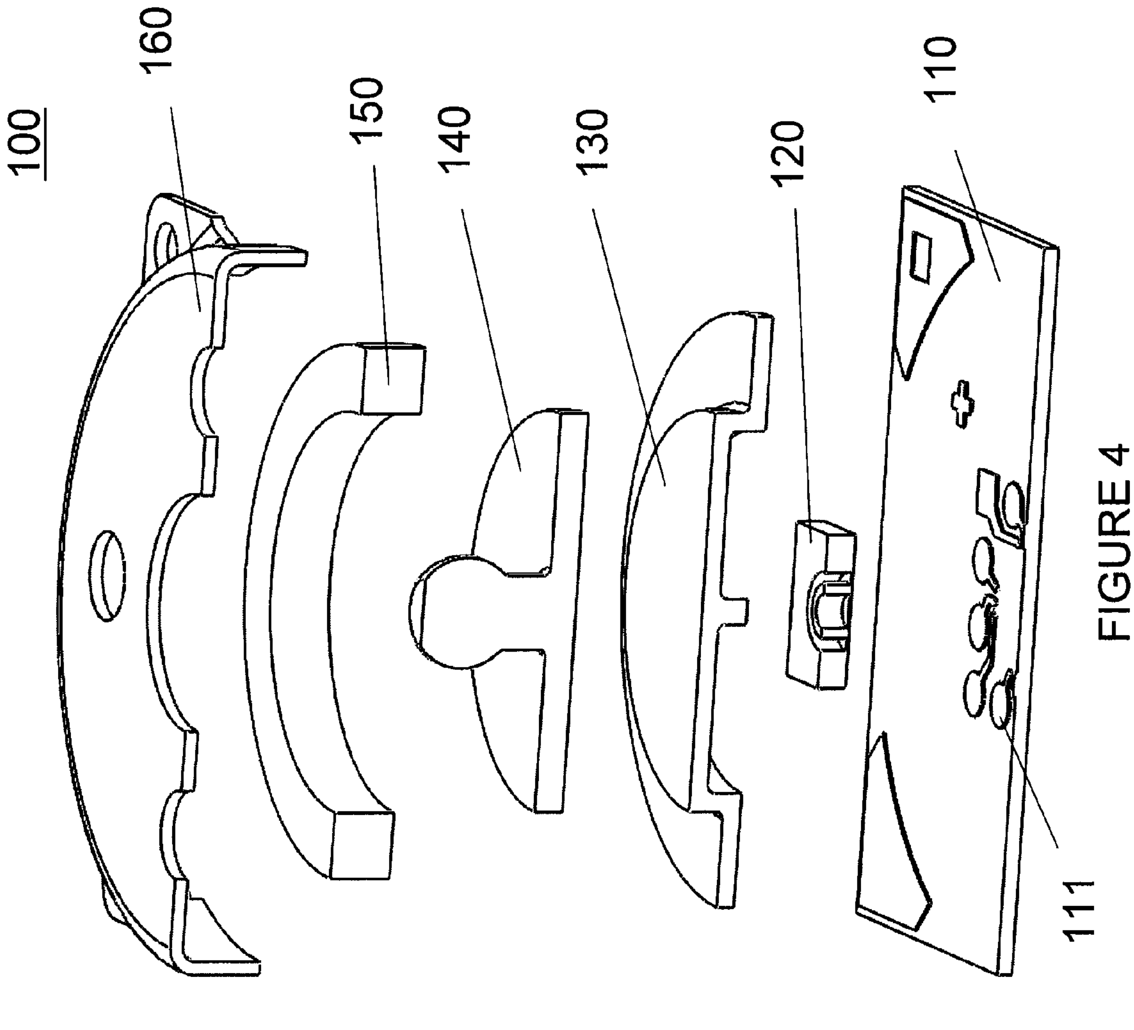
FIG. 4 is an exploded cross-sectional view of the human interface device of FIG. 2.

While the invention of the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claims.

FIG. 1 illustrates the flexibility and usefulness of a human interface device 2 in accordance with one or more of the herein described embodiments. The human interface device 2 has small dimensions suitable for inclusion in small and/or thin electronic devices, has high yield due to its simplicity, is robust against overloads, and is easy to manufacture. In this regard the human interface device 2 provides an X-Y axis pointing functionality that can be included in various types of electronic devices, including web-enabled phones, smart phones, personal digital assistant (PDA) devices, gaming devices, laptops, tablet computing devices, notebooks, personal computers, cameras, televisions, ovens, microwaves, global positioning systems (GPSs), blu-ray player, HD-DVD players, DVD players, other types of portable computing and Internet access appliances and devices, digital imaging devices, consumer electronic devices, in-vehicle devices, navigation systems and the like. The human interface device 2 for navigating tasks or information content could be also integrated in other user interface control devices, such as a computer mouse, a joystick, stylus, remote control, keyboard, keypad, other types of input devices for portable computing and Internet access appliances and devices, consumer electronic devices, in-vehicle devices and the like. The human interface device 2 may have a thickness of about 1.5 mm or less and may have a length of about 10 mm or less, though other dimensions are also contemplated.

In an embodiment, a human interface device is provided. The device has a substrate. The device also has a strain sensitive die coupled to the substrate wherein the die is capable of providing an electrical signal indicative of a force applied to the strain sensitive die. A force transfer element is positioned adjacent to the strain sensitive die and coupled to the strain sensitive die. A translation element is mechanically coupled to the force transfer element. An elastic element at least partially surrounds the translation element and the force transfer element, wherein the elastic element provides the mechanical coupling between the translation element and the force transfer element. A force applied to the translation element causes stretching of the elastic element. The stretching of the elastic element causes a force to be applied to the force transfer element. The force applied to the force transfer element by the elastic element is then applied to the strain sensitive die.

In an embodiment, the force translation element is shaped to prevent vertical forces which are applied to the translation element from being transferred to the strain sensitive die.

In an embodiment, a housing is provided at least partially covering the force transfer element.

In an embodiment, the housing provides a physical limit for movement of the translation element.

In an embodiment, the elastic element is a spring.

In an embodiment, the human interface device is surface mountable.

In another embodiment, a human interface device is provided having a substrate. A strain sensitive die is coupled to the substrate wherein the die is capable of providing an electrical signal indicative of a force applied to the strain sensitive die. A force transfer element is positioned adjacent to the strain sensitive die and coupled to the strain sensitive die. A translation element is mechanically coupled to the force transfer element. An elastic element is adjacent to the translation element and the force transfer element, wherein the elastic element provides the mechanical coupling between the translation element and the force transfer element. A force applied to the translation element causes stretching of the elastic element. Stretching of the elastic element causes a force to be applied to the force transfer element. The force applied to the force transfer element by the elastic element is then applied to the strain sensitive die.

In an embodiment, the force translation element is shaped to prevent vertical forces which are applied to the translation element from being transferred to the strain sensitive die.

In an embodiment, a housing is provided that at least partially covers the force transfer element.

In an embodiment, the housing provides a physical limit for movement of the translation element.

In an embodiment, the elastic element is a spring.

In an embodiment, the human interface device is surface mountable.

FIGS. 2 through 9 show increasingly more detail of embodiments of a human interface device. Thus numbers in each of the figures correspond to like elements.

There are six functional elements in this invention: 1) a substrate 110, 2) a strain sensitive die 120, 3) a force transfer element 130, 4) a translation element 140, 5) a spring or elastic element 150, and, 6) a housing 160. These functional elements work cooperatively to achieve the objectives of creating a robust, low profile human interface device. However, although described below as six physically separate elements, it is contemplated that some functions can be combined in a single physical element. For instance, the elastic function and the force transfer function could be accomplished in a single physical element. See, for example, the embodiment of FIG. 8, which will be described in further detail below.

The substrate 110 provides a platform onto which the strain sensitive die 120 is mounted and serves to route the electrical interface from the die to an opposite surface. It is contemplated that the human interface device 100 will be surface mounted to an application device's PCB (not shown). The substrate 110 of the human interface device 100 defines a surface which is physically and electrically attached to the device's PCB in, for example, a surface mounting process. It is contemplated that, in an embodiment, the substrate 110 is ceramic, printed circuit board material, or similar. The substrate 110 has metalized traces 111 (opposite side not shown) on both sides. The strain sensitive die 120 is mounted to one side of the substrate 110 while the opposite side connects to a device PCB. Thus, signals indicative of movement of the translation element 140 can be communicated from the human interface device 100 to the application device through the PCB of the application device.

The strain sensitive die 120 is similar to that of the previously referenced patents in that the die contains a boss, an elastic region, an outer frame, and strain sensitive elements to convert strain into an electrical signal. It is contemplated that the die 120 is mounted to the substrate 110 via flip chip bonding. However, other methods of coupling are also contemplated, as known to those of skill in the art. This puts the electrical interface on the surface between the die 120 and the substrate 110 while the mechanical interface to the die 120 is accomplished on the opposite side of the die 120. This keeps the electrical and the mechanical interfaces separate and avoids interference between them, thus minimizing potential reliability problems.

The force transfer element 130 provides an interface through which lateral forces are applied to the die and may prevent vertical forces from reaching the die 120. This assists in achieving protection of the die 120 and may be accomplished by constraining either the force transfer element 130 to rest on the substrate 110 as shown in the figure, or by constraining the translation element in such a way as to limit its ability to apply a vertical load to the force transfer element.

The translation element 140 is connected to the force transfer element 130 through the elastic element 150. The user moves the translation element 140 either directly or indirectly and the elastic element 150 produces a corresponding force on the force transfer element 130. The translation element 140 is constrained to only move in lateral directions. The translation element 140 and/or the force transfer element 130 are permitted to rotate freely about a vertical axis relative to the die 120, thus decoupling this motion from the die 120.

The housing 160 attaches to the substrate 110 encasing the entire human interface device 100. The housing 160 serves to limit the amount of translation that can be applied to the translation element 140, thus in turn ultimately limiting the maximum force applied to the die 110. When a user applies a force to the translation element 140, it moves, stretching elastic element 150. The elastic element 150 in its stretched state applies a force to the force transfer element 130 which in turn applies the force to the strain sensitive die 120. The die 120 creates an electrical output corresponding to the original user applied force.

Figure 6A:
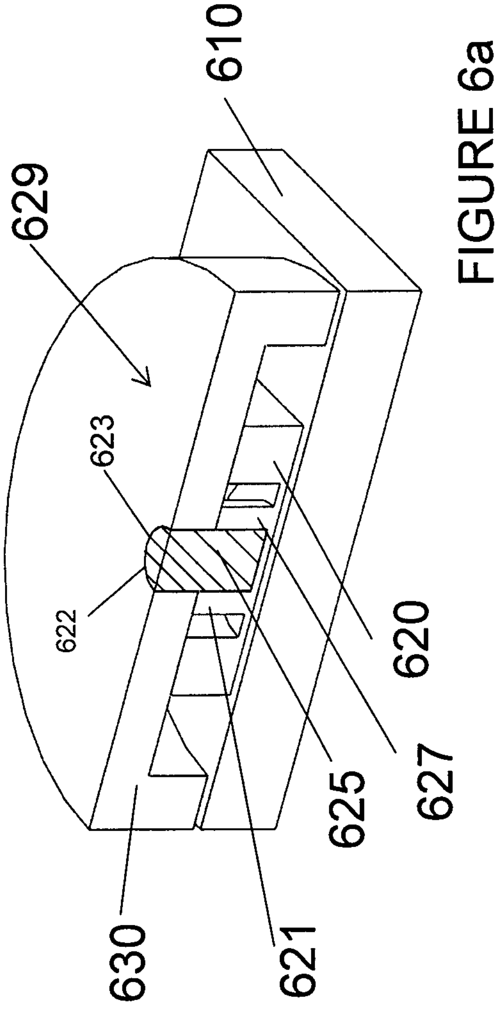
FIG. 6A is a perspective cross-sectional view of a substrate, die and force transfer element as part of a human interface device in an embodiment of the present invention.
Figure 6B:
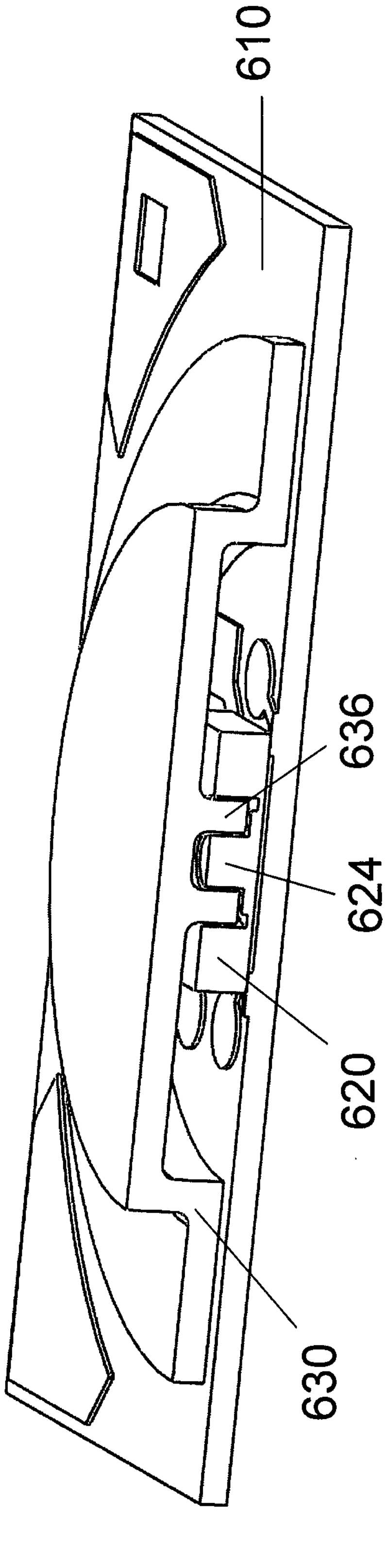
FIG. 6B is a perspective, cross-sectional view of a human interface device in an embodiment of the present invention.

The force transfer element can engage, or be otherwise coupled to, the strain sensitive die in a variety of ways. FIGS. 6A & 6B show some examples. In FIG. 6A, a pin 622 engages a hole 623 in force transfer element 630 and a hole 625 in the boss 627 of strain sensitive die 620. The pin 622 may be adjacent to a surrounding wall or cylinder 621 of the die 620.

This pin 622 effectively couples the force applied to the force transfer element 630 to the boss of the strain sensitive die 620. The pin 622 may have a height which extends to a top surface 629 of the force transfer element 630. In another embodiment, the force transfer element has a member (not shown) shaped similarly to the pin 622 but integrally formed which extends into the hole 625 of the strain sensitive die 620. The member serves the same function as the pin 622. Although shown having a cylindrical shape, the pin 622 may have any shape contemplated by those of skill in the art, and may be constructed from any material contemplated by those of skill in the art. The pin 622 may be rigid; however, in other embodiments, the pin 622 may be constructed from a softer material that may, for example, provide a desired sensitivity and/or delay in the transmission of a signal to the application PCB.

In FIG. 6B, a cylinder 636 is formed on, or otherwise attached to, force transfer element 630 and surrounds the boss 624 of strain sensitive die 620. The cylinder 636 is adjacent to and, in some embodiments, in contact with the boss 624, thus effectively transferring the force applied to the force transfer element 630 to the strain sensitive die 620. In each of these examples, the goal is to provide a robust engagement capable of withstanding the shear forces applied. They also allow rotation about the principle axis thus protecting the die from any torque applied to the force transfer element 630 by a user.

Figure 7B:
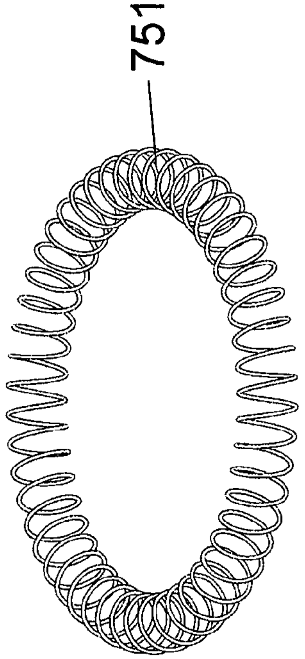
FIGS. 7A, 7B and &C are perspective views of elastic elements which may be utilized within a human interface device in various embodiments of the present invention.
Figure 7A:
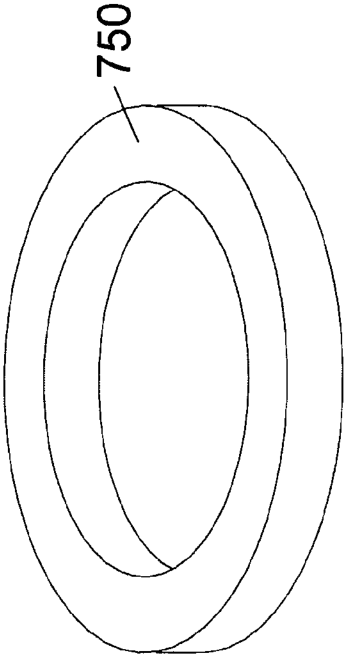
Figure 7C:
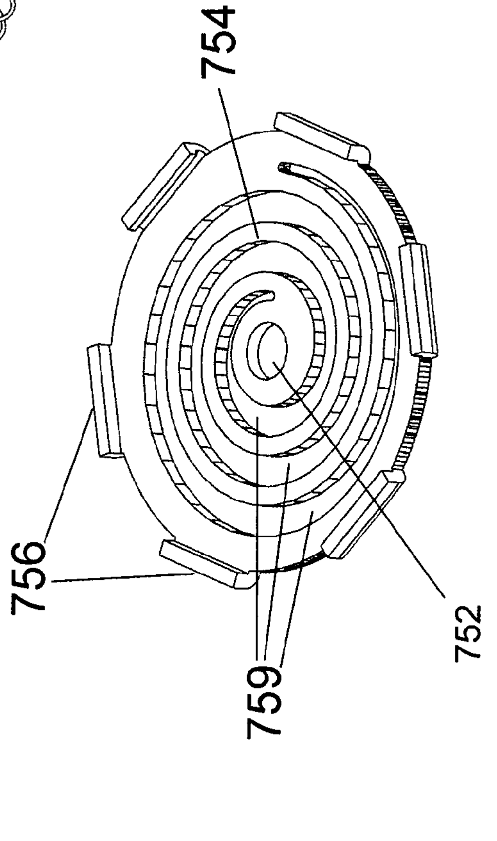

The elastic element can take a variety of forms or shapes, such as circular, oval, rectangular, or other shape. In FIG. 7A, an elastic band 750 is shown. This band 750 is made from, for example, a material like silicone. Other elastic materials are also contemplated. In FIG. 7B, a helical spring 751 is disclosed as an elastic element. This spring 751 may be made from a stainless steel wire; however it could also be made with other elastic materials, such as plastics. FIG. 7C shows an alternative elastic element 754 in the form of a spiral shaped spring. This spring may be chemical-etched from a metal foil but may also be molded from plastic. The spring 754 may, for instance, engage the force transfer element via its center hole 752 (such as, for example, via a pin) while engaging the translation element at its perimeter via tangs 756 which may contact a perimeter of the translation element. In another embodiment, the spiral spring 754 does not have tangs. The type of elastic element used may be based upon a desired sensitivity for the human interface device.

Figure 8:
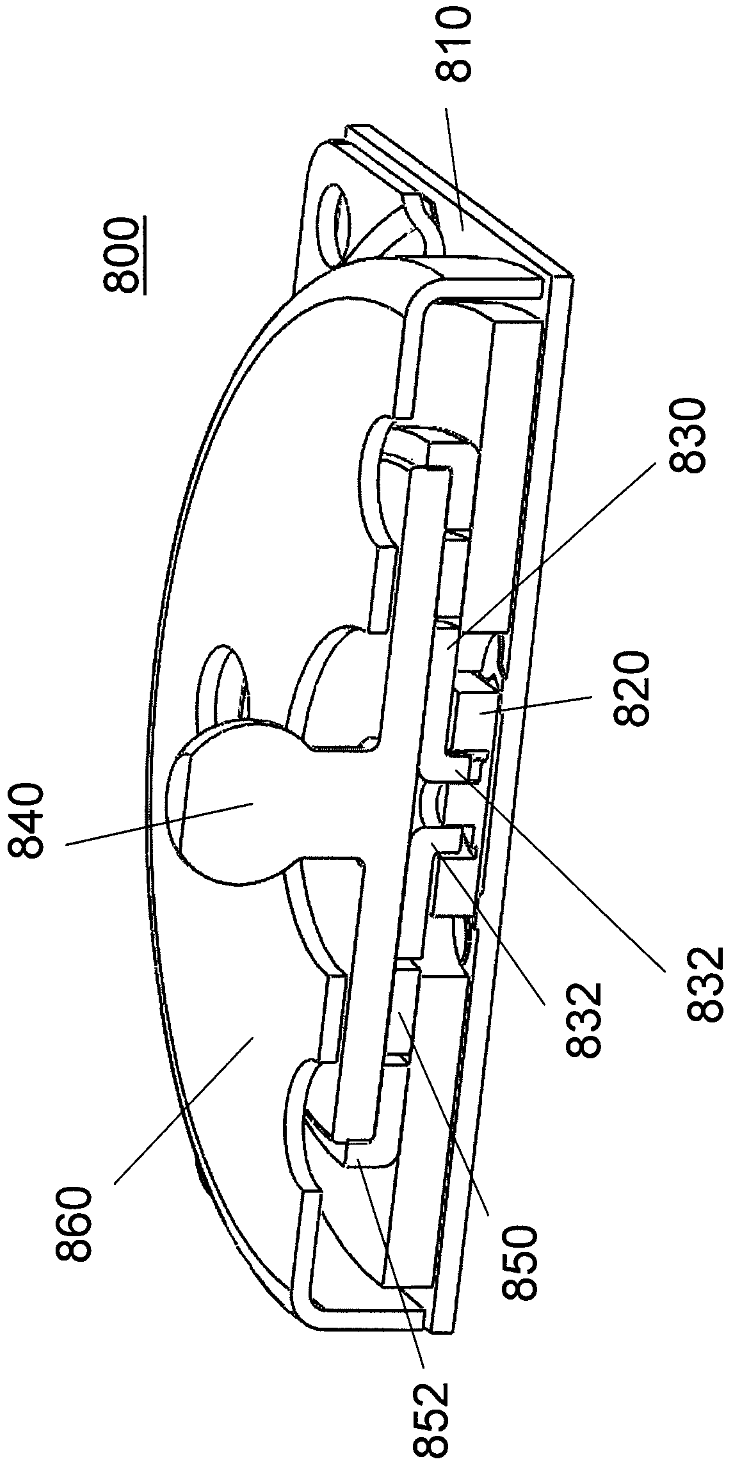
FIG. 8 is a perspective cross-sectional view of a human interface device in an embodiment of the present invention in which an elastic element is utilized having tangs.

An example of a spiral spring elastic element 850 is shown in FIG. 8 where the force transfer element 830 is integrated into the center of the spiral spring elastic element 850. More specifically, extended members 832 of the force transfer element 830 are aligned and inserted in spaces in the spiral spring 850. Although the spaces are not shown in FIG. 8, they may be similar to spaces 759 in the spiral spring 754. The translation element 840 engages bent tangs 852 at a perimeter of the spiral elastic element 850. It is envisioned that by turning the spiral spring element 850 upside down, it could also be integrated with the translation element 840 and would then engage the force translation element 830 wherein the bent tangs 852 surround the perimeter of the force transfer element 830.

Figure 9:
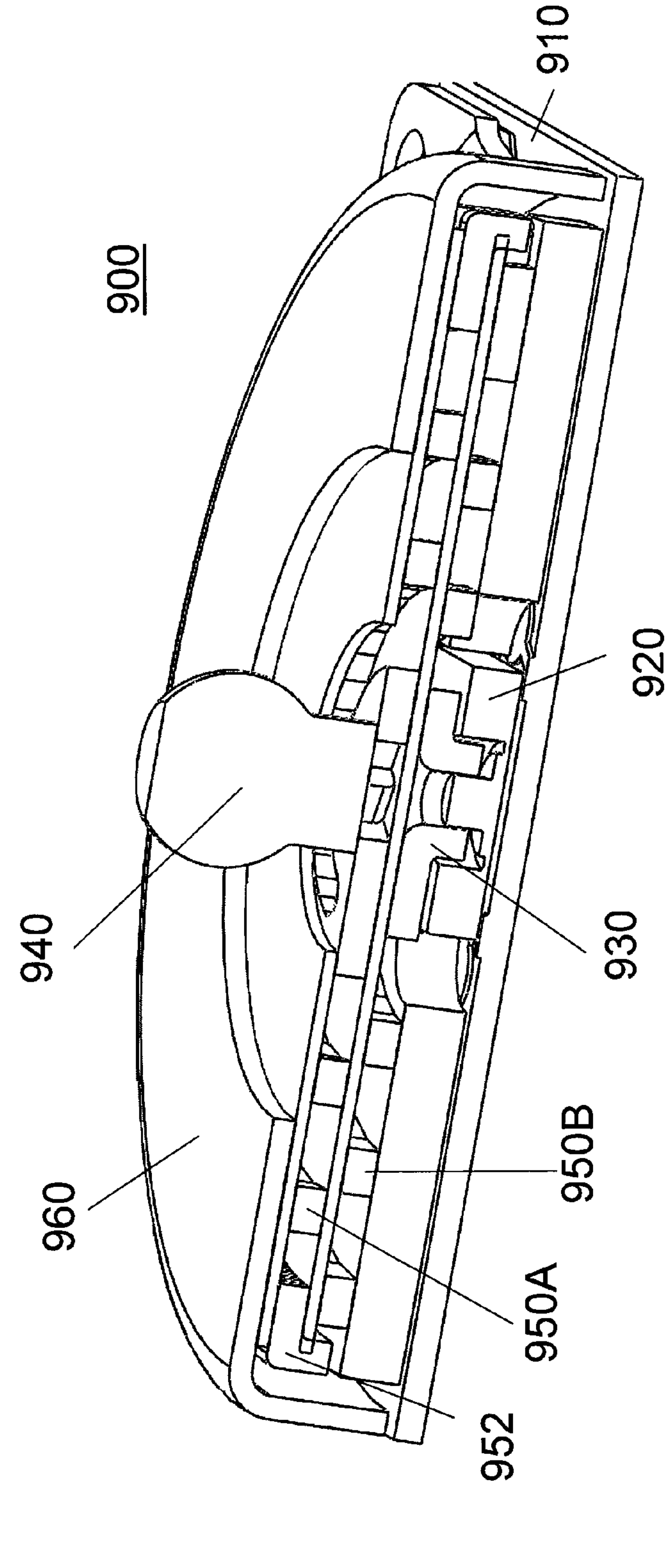
FIG. 9 is a perspective cross-sectional view of a human interface device in an embodiment of the present invention in which the elastic element is comprised of two spring elements.

An alternative embodiment, shown in FIG. 9, uses two spiral springs 950A, 950B. Spiral spring 950A has bent tangs 952. It is envisioned that spring 950B would also have tangs, whereby the tangs of both spring 950A and spring 950B engage each other to interlock (to clarify, the tangs of one spring would be positioned between the tangs of the other spring). The translation element 940 would be integrated with the center of spring 950A while the force transfer element 930 would be integrated at the center of the second spring 950B. The springs 950A and 950B may, in an embodiment, have identical diameters.

Figure 5:
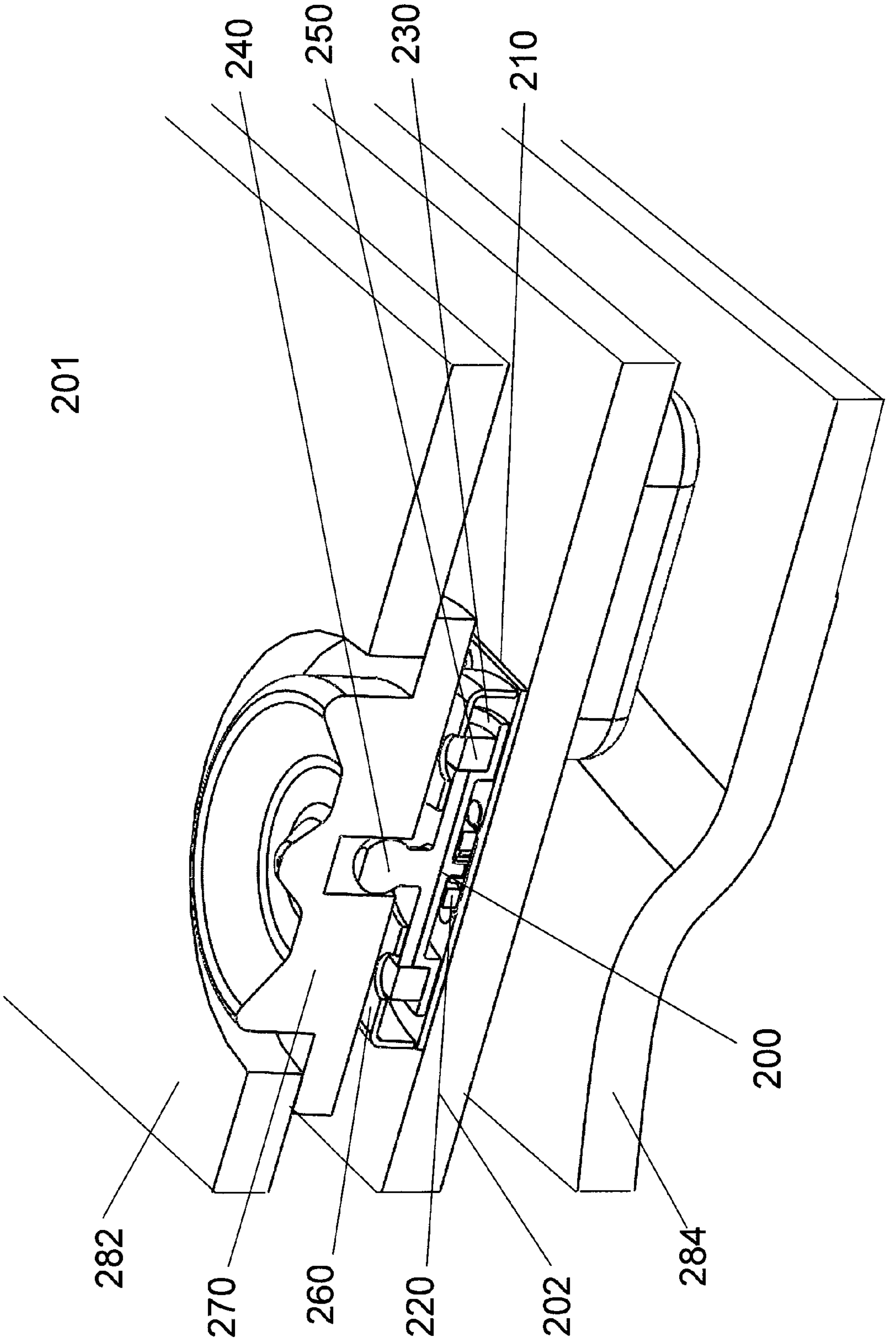
FIG. 5 is a cross-sectional view of a human interface device in an application device according to an embodiment of the invention.

Referring now to FIG. 5, a human interface device 200 is mounted in an application device 201. The substrate 210 of human interface device 200 is surface mounted to application device PCB 202. Upper case 282 and lower case 284 house the application device 201. Button 270 protrudes through the surface of upper case 282 to enable user access. Button 270 engages translation element 240 such that when the button 270 is moved laterally, the translation element 240 moves in a corresponding manner. The button 270 may be positioned on the housing 260 of the device 200.

Preferred embodiments of this invention are described herein, including the best mode known to the inventors for carrying out the invention. It should be understood that the illustrated embodiments are exemplary only, and should not be taken as limiting the scope of the invention.

We claim:

1. A human interface device comprising:
- a substrate;
- a strain sensitive die coupled to the substrate wherein the die is capable of providing an electrical signal indicative of a force applied to the strain sensitive die;
- a force transfer element positioned adjacent to the strain sensitive die and coupled to the strain sensitive die;
- a translation element mechanically coupled to the force transfer element, the translation element configured only to move in a lateral direction;
- wherein the translation element and the force transfer element are configured to rotate separately about a vertical axis relative to the strain sensitive die;
- an elastic element at least partially surrounding the translation element and the force transfer element, wherein the elastic element provides the mechanical coupling between the translation element and the force transfer element, the elastic element being physically separate and distinct from the force transfer element;
- a housing at least partially covering and surrounding the force transfer element;
- wherein a force applied to the translation element causes stretching of the elastic element;
- and wherein the stretching of the elastic element causes a force to be applied to the force transfer element;
- wherein the force applied to the force transfer element by the elastic element is then applied to the strain sensitive die; and
- wherein the force transfer element is configured to prevent any vertical forces which are applied to the translation element from being transferred to the strain sensitive die and instead be transferred to the substrate.

2. The human interface device of claim 1 wherein the housing provides a physical limit for movement of the translation element.

3. The human interface device of claim 1 wherein the elastic element is a spring.

4. The human interface device of claim 1 being surface mountable.

5. A human interface device comprising:
- a substrate;
- a strain sensitive die coupled to the substrate wherein the die is capable of providing an electrical signal indicative of a force applied to the strain sensitive die;
- a force transfer element positioned adjacent to the strain sensitive die and coupled to the strain sensitive die;

a translation element mechanically coupled to the force transfer element, the translation element configured only to move in a lateral direction;

wherein the translation element and the force transfer element are configured to rotate separately about a vertical axis relative to the strain sensitive die;

an elastic element adjacent to the translation element and the force transfer element, the elastic element being physically separate and distinct from the force transfer element, a housing at least partially covering and surrounding the force transfer element, wherein the housing provides a physical limit for movement of the translation element;

wherein the elastic element provides the mechanical coupling between the translation element and the force transfer element;

wherein a force applied to the translation element causes stretching of the elastic element;

and wherein the stretching of the elastic element causes a force to be applied to the force transfer element;

wherein the force applied to the force transfer element by the elastic element is then applied to the strain sensitive die; and wherein the force transfer element is configured to prevent any vertical forces which are applied to the translation element from being transferred to the strain sensitive die and instead to be transferred to the substrate.

6. The human interface device of claim 5 wherein the elastic element is a spring.

7. The human interface device of claim 5 being surface mountable.

8. An apparatus, the apparatus comprising:

a translation element that is configured to receive a force imparted by a user, the translation element being configured for movement in a first horizontal plane;

an elastic element that is coupled to the translation element;

a force transfer element that is coupled to the elastic element, the force transfer element being disposed in a second horizontal plane beneath and in parallel to the first horizontal plane, the elastic element being physically separate and distinct from the force transfer element;

a die coupled to the force transfer element;

a housing that surrounds the translation element, the housing being configured to restrict movement of the translation element across the first horizontal plane;

wherein the translation element configured only to move in a lateral direction;

wherein the translation element and the force transfer element are configured to rotate separately about a vertical axis relative to the strain sensitive die;

such that the force imparted by the user moves the translation element across the first horizontal plane as restricted by the housing, the force being transferred through the elastic element, to the force transfer element, and across the second horizontal plane to the die;

the apparatus being configured so as to prevent any force from being transferred in a vertical direction from the first horizontal plane to the die.

* * * * *